United States Patent

Bröckerhoff et al.

Patent Number: 6,071,482
Date of Patent: Jun. 6, 2000

[54] DEVICE FOR COOLING AND INTERMIXING OF GAS FROM ACCIDENTAL LEAKS

[75] Inventors: Peter Bröckerhoff, Jülich; Werner von Lensa, Langerwehe; Ernst Arndt Reinecke, Aachen, all of Germany

[73] Assignee: Forschungszentrum Jülich GmbH, Jülich, Germany

[21] Appl. No.: 09/085,723

[22] Filed: May 27, 1998

[30] Foreign Application Priority Data

May 28, 1997 [DE] Germany ............ 197 22 305

[51] Int. Cl.[7] .............. B01D 5/00; B01D 53/34; G21C 13/10
[52] U.S. Cl. ............ 422/173; 422/171; 422/198; 588/259
[58] Field of Search .............. 422/169–171, 422/173, 200, 201; 588/259; 60/39.511, 39.52; 55/318, 338.1, 383, 385.7, 405, 408

[56] References Cited

U.S. PATENT DOCUMENTS

| | | | |
|---|---|---|---|
| 3,349,248 | 10/1967 | Garnier | 290/2 |
| 3,369,361 | 2/1968 | Craig | 60/39.5 |
| 3,962,864 | 6/1976 | Williams et al. | 60/39.161 |
| 4,416,850 | 11/1983 | Kodama et al. | 376/310 |

FOREIGN PATENT DOCUMENTS

| | | |
|---|---|---|
| 073403 | 3/1983 | European Pat. Off. |
| 32 347 | 6/1985 | European Pat. Off. |
| 798464 | 10/1997 | European Pat. Off. |
| 1 066 288 | 3/1960 | Germany |
| 28 47 862 | 5/1979 | Germany |
| 28 05 476 | 8/1979 | Germany |
| 31 43 989 | 2/1983 | Germany |
| 31 34 019 | 5/1984 | Germany |
| 37 30 955 | 3/1989 | Germany |
| 4416140 | 11/1994 | Germany |

OTHER PUBLICATIONS

Von Hans–Henning Hennies, Günther Kessler and Josef Eibl, "Sicherheitsumschliessungen in künftigen Reaktoren", *Atomwirtschaft*, (1992), 238–247.

Von F.W. Heuser, "Risikountersuchungen zu Unfällen in Kernkraftwerken", *Atomwirtschaft*, (1987), 79–85.

Primary Examiner—Marian C. Knode
Assistant Examiner—Susan Ohorodnik
Attorney, Agent, or Firm—Frishauf, Holtz, Goodman, Langer & Chick, P.C.

[57] ABSTRACT

A device for the cooling and intermixing of gas from accidental leaks, such as from a nuclear reaction containment, i.e., accident atmospheres, which device prevents stratification and provides improved cooling capacity. The device includes a housing, having an inlet and an outlet and which predefines a flow path for the accident atmosphere. The device has a fan wheel, which is disposed in the housing downstream from the inlet and which is connected to a shaft. The device also has a cooling device which is disposed between the fan wheel and the outlet. A compressor wheel is connected to the shaft at the end thereof which is opposite to the fan wheel. The compressor wheel is disposed between the cooling device and the outlet.

20 Claims, 2 Drawing Sheets

DEVICE FOR COOLING AND INTERMIXING OF GAS FROM ACCIDENTAL LEAKS

BACKGROUND OF THE INVENTION

1. Field of the Invention

The present invention relates to a device which, for the purposes of safety, passively cools gas from accidental leaks which form a gaseous "accident atmosphere". More particularly, the present invention thus prevents the stratification of incondensible gases during accidents, for example, in plants for power generation or process engineering, after escape of steam or other condensible gases from accidental gas leaks.

2. Background Information

The problem solved by the present invention will be explained with reference to the example of a water-cooled nuclear reactor.

In serious accidents, steam and possibly also hydrogen can enter the containment surrounding a nuclear reactor. Therein the atmosphere is usually air (oxygen and nitrogen), or in some cases predominantly nitrogen for maintaining an inert atmosphere. Steam and hydrogen cause both the pressure and temperature of the containment atmosphere to rise. Both effects lead to increased stresses and strains on the containment wall and, if leaks are present, act as the driving force for escape of radiotoxic substances. The simultaneous presence of oxygen and hydrogen can cause deflagrations or even detonations if the ignition limits are exceeded. These lead to further loads on the containment wall. Appropriate safety features, some of which are complex, must be provided in order to prevent destruction of plant components or of the plant itself.

Because of natural convection, and especially in the presence of hydrogen, a danger also exists of stratification or layer development in the dome of the containment. As one possible consequence thereof, the efficiency of coolers can also be greatly impaired, if they are located in zones enriched with incondensible gases.

A provision known from the prior art comprises the use of active or passive cooling devices mounted at appropriate positions (e.g., in the dome of a containment). Part of the heat conveyed into the accident atmosphere is extracted by these cooling devices and removed to the outside. Devices of such design suffer from the disadvantage, however, of higher concentrations of gaseous substances that do not condense and that lead to poorer heat removal at the heat-exchanging surfaces. Condensation of the steam contained in the accident atmosphere is effected mainly with the objective of lowering the pressure, in order to reduce the danger of leaks with the concomitant release of harmful substances. DE 31 34 019 C2 describes a device for the intermixing of gas from accidental leaks. In DE 31 34 019 C2, there is provided a blower disposed in an opening through a wall. Such a blower represents an active element, which, however, can only run on externally supplied power, even during accidents.

Spray systems wherein finely dispersed water is injected into the accident atmosphere are also known. These systems work very effectively, but are based on the principle of active safety and, usually, depend on the actuation of valves, pumps, control mechanisms and external power, as well as coolant and water supply.

DE 28 47 862 A1 (a related family member of which is U.S. Pat. No. 4,416,850) discloses such a cooling device in which cooling water is sprayed into the gas atmosphere. Downstream from the spray device there are provided a heat exchanger and a moisture separator for collection of radioactive vapors from the gas atmosphere. Finally, a device for removing the collected liquid ensures that the cooling water is removed from the gas-treatment housing.

In some cases, recycling of the collected condensate for emergency cooling purposes is provided. In this connection, the greatest possible difference between the geodetic heads of condensate source and the return can be advantageous in overcoming flow resistances, nonreturn valves and back-pressures.

Apart from the cooling and intermixing of accident atmospheres, a further problem of eliminating combustible gases and mixtures (such as hydrogen) is usually countered by means of catalytic recombiners, in which hydrogen and atmospheric oxygen, for example, flow along catalytically active surfaces and react exothermically thereon. An advantage of this method is that the hydrogen content is reduced and simultaneously the pressure is lowered. A disadvantage, however, is the additional introduction of heat into the containment atmosphere. The consequence is an increased demand for effective cooling since, at higher temperatures, the tendency toward further stratification is further increased by natural convection. Furthermore, a sufficient flow for the intermixing of the accident atmosphere is necessary to achieve a high hydrogen throughput rate.

Furthermore, DE 31 43 989 C1 discloses a recombination device for the controlled oxidation of free hydrogen inside the containment.

In DE 31 43 989 C1, lines, e.g., pipes or ducts, for the intermixing of the gas atmosphere run vertically over at least half of the containment height and are equipped with a transport device in the form of a fan. The fan transports the gas mixture from the upper region to the lower region of the containment. The recombination device is disposed downstream from the fan. The principles of passive safety are also not practiced in DE 31 43 898 C1, since an external power supply is necessary for the operation of the fan.

SUMMARY OF THE INVENTION

The present invention therefore addresses the technical problem of developing an efficient device for the cooling and intermixing of an accident atmosphere, wherein stratification can be prevented and the cooling capacity can be improved.

The technical problem described in the foregoing is solved according to the present invention. In the present invention, a flow path for the accident atmosphere is predefined by a housing. In the flow path there is further provided a fan wheel, which is connected to a shaft. Downstream from the fan wheel there is disposed a cooling device which cools the hot steamy accident atmosphere. Finally, in the flow path downstream from the cooling device there is disposed a compressor wheel connected with the shaft, which therefore shares the rotational movement of the fan wheel and transports the emerging gas mixture out of the housing.

The present invention is directed to a device for the cooling and mixing of gas from an accidental gas leak, i.e., an accident atmosphere. The device includes the following:

a housing which is provided with an inlet for removing the gas and an outlet from which the gas exits the housing and which defines a flow path for the gas, a fan wheel which is disposed in the housing downstream from the inlet and which is rotatably driven by the gas, the fan wheel being connected to a shaft which is rotated by the rotatably driven fan wheel, a cooling device disposed between the fan wheel and the outlet, and a compressor wheel which is connected to the shaft at an end thereof opposite to the connection of the shaft to the fan wheel, the compressor wheel being disposed between the cooling device and the outlet, the fan wheel, the shaft and the compressor wheel in combination form a turbocompressor unit.

The present invention also concerns a reaction system comprising:

a reactor vessel, a containment which sealingly encapsulates the reaction vessel and provides space between the reaction vessel and the containment for accommodating a gaseous atmosphere, and the device as defined above, wherein accidental gas leaks from the reactor vessel enter the atmosphere in the containment and are received in the inlet of the device, and wherein cooled gas from the outlet of the device is returned to the atmosphere in the containment.

BRIEF DESCRIPTION OF THE DRAWINGS

For the purpose of illustrating the invention there is shown in the drawings forms which are presently preferred. It is to be understood, however, that the present invention is not limited to the precise arrangements and instrumentalities depicted in the drawings.

DETAILED DESCRIPTION OF THE INVENTION

Figure 1:
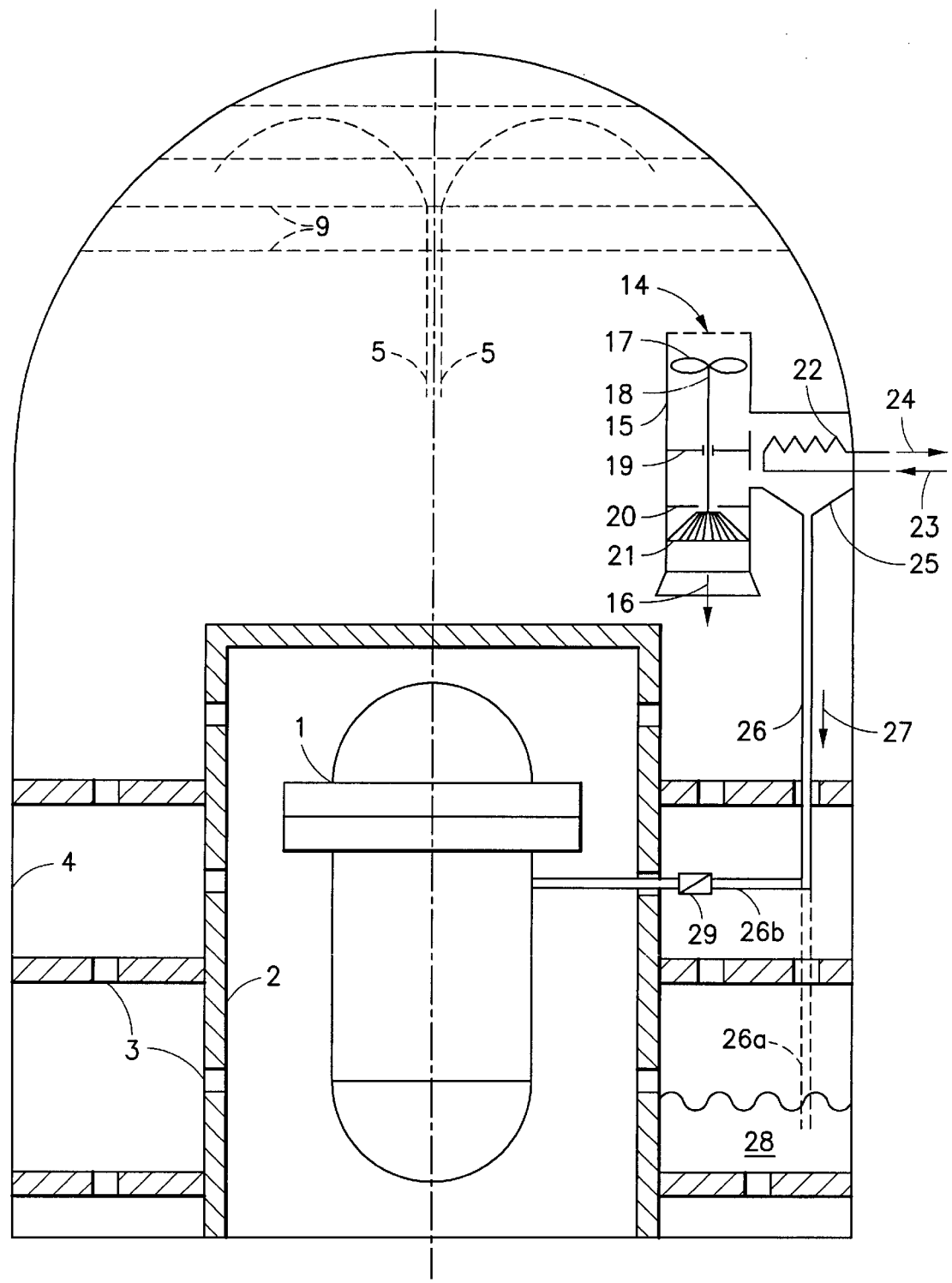
FIG. 1 is a schematic drawing which shows a power-generating plant in which there is disposed a practical example of the device according to the present invention for the cooling and intermixing of accident atmospheres.

The device described hereinabove for the cooling and mixing of gaseous accident atmospheres functions in the following way. The hot and steamy atmosphere entering the housing of the device according to the present invention is cool ed in the cooling device, so that condensation of the condensible substances, especially of the steam, takes place. Thereby there is achieved a reduction in volume of these constituents of the accident atmosphere, whereby there is generated a reduced pressure relative to the inlet of the housing. This reduced pressure leads to development of a forced gas flow through the housing of the device. Thus hot gaseous, condensible and incondensible substances are drawn continuously from the accident atmosphere into the housing. The reduced pressure is maintained by continuous cooling in the cooling device, and so a continuous gas flow through the housing of the device according to the present invention is generated.

By virtue of the above described flow of the accident atmosphere through the housing, the fan wheel such as in the form of a propeller or blade such as is used in a turbine, and is disposed close to the housing inlet and is driven in a rotational movement. The fan wheel is preferably an axial-flow wheel. The blades of the fan wheel can have the form of, for example, a windmill propeller. The blades of the fan wheel can also have a rectangular shape or a trapezoidal shape. The rotational movement generated by the fan wheel is transmitted via the shaft to the compressor wheel such as in the form of a rotor having a plurality of vanes or blades as employed in a compressor. As a result, the cooled gas constituents of the accident atmosphere are returned via the compressor wheel into the containment atmosphere. The resulting emerging gas stream and the corresponding swirling effects lead to the intermixing of the accident atmosphere, and so development of layers in the accident atmosphere is weakened or even prevented. In the process, the natural draft due to free convection is combined with a forced flow generated by the compressor wheel. A further advantage of increased intermixing of the accident atmosphere is that incondensible constituents of the accident atmosphere are carried away from the surfaces of the cooling device in the housing, thus increasing the cooling capacity of the cooling device.

The compressor wheel is preferably a radial-flow wheel. The blades of the compressor wheel can be, for example, like a fan impeller. Both the fan wheel and the compressor wheel should be optimized in regard to blade shape, number and incidence for the particular use.

Preferably, the flow path in the housing is directed substantially from top to bottom. Thus the accident atmosphere is advantageously transported from the region of the dome of the containment downward, so that, in particular, stratification or layer development in the dome can be broken up or completely prevented.

In a preferred embodiment of the present invention, a condensate tank is provided underneath the cooling device to collect the condensate formed on the cooling device during cooling of the heated accident atmosphere. A line, e.g., a pipe, is provided through which this condensate is either passed into a water pool or returned to the pressure vessel for further cooling. The condensate can also be returned together with other incondensible constituents to the accident atmosphere for the purpose of cooling. This is achieved preferably by the flow generated by the compressor wheel and leading to spraying of the condensate into the accident atmosphere.

In a further preferred embodiment of the present invention, there is provided a motor which drives the shaft, and if necessary, assists in the starting of the shaft. In this active embodiment of the device for the cooling and intermixing of accident atmospheres, the cooling and intermixing process not only is initiated after development of a flow caused by a pressure gradient, but also is actively supported by the motor. To ensure passive safety in this case, the free running of the shaft must not be prevented in the event of failure of the motor or of the power supply necessary for actuation of the motor. Accordingly, the shaft can be rotated solely by the flow of gas across the fan wheel in the absence of any external mechanical or electrical devices such as a motor. Thus the rotational movement of the shaft does not depend on any external power source and the present invention is operable in the absence of any external power source such as electricity.

In a still further preferred embodiment of the present invention it is possible to utilize the rotational movement of the shaft generated by the flow of the accident atmosphere through the housing to drive pumps, generators, compressors or similar devices. In the event of an accident or of a failure of the other power supply, the energy contained in the flow through the housing is then utilized in order to support and reinforce the sequences necessary for handling the accident. For example, by means of a pump, the condensate can be returned together with the other incondensible constituents to the accident atmosphere for the purpose of additional cooling. Furthermore, by means of the shaft, a pump of the coolant loop can be driven, and so increased cooling capacity of the cooling device, for example, is achieved without reliance on an external power supply.

The elimination of hydrogen by an exothermic reaction of hydrogen in the presence of atmospheric oxygen on catalytically active catalyst elements over or through which a flow is passing, as known from the prior art, can be combined advantageously with the device of the present invention for the cooling and intermixing of accident atmospheres. For this purpose, the catalyst elements are disposed in the flow path inside the housing. As a result, the existing flow of accident atmosphere is utilized advantageously in order to direct the atmosphere containing hydrogen and oxygen to the catalyst elements.

The base material or substrate of the catalytic element can be either metal or ceramic. Wire gauzes, expanded metal or beds of balls can be used. Ceramic substrates could also be gauzes, or alternatively mats or granules with various size distributions. Following suitable pretreatment, the substrates are coated firstly with a wash coat and then with a catalyst. Platinum and palladium are particularly preferred as catalyst materials. However, the other noble metals or mixtures thereof or non-noble metals can also be used.

Furthermore, cooling elements are advantageously provided for cooling of the catalyst elements. This is necessary in order to ensure rapid removal of the heat produced during the exothermic reaction, either by convection or by conduction through solids or by temporary storage, and thus to prevent additional heating of the atmosphere and volume expansion. The cooling elements in this case are connected to the cooling loop of the cooling device, which is disposed in the housing of the device for cooling and intermixing of accident atmospheres, or the cooling elements discharge the absorbed thermal energy directly to the cooling device. In this way overheating of the accident atmosphere to ignition temperatures is effectively prevented.

The invention will be explained in more detail hereinafter on the basis of a practical example with reference to the drawings.

In FIG. 1, a reactor vessel 1 is disposed in a drywell 2. Any accident which results in the release of hydrogen and steam causes excess pressure. Steam and hydrogen flow through overflow vents 3 in the drywell 2 into the inside of the containment 4. The hot constituents rise by natural convection, as illustrated by reference numeral 5. As a result, large convection surges can develop in the large containment volume. Layers of stratification in the dome of the containment 4 are indicated by reference numeral 9.

The right half of FIG. 1 shows a device 15 according to the present invention, in which the mixture rich in steam and possibly also hydrogen enters at the top via the inlet 14 and exits in stripped and cooled condition at the bottom from the outlet 16. The device 15 can be a cylindrical vessel such as to form a tubular volume therein. On its way through the device 15, the mixture passes over the cooling device 22, which comprises cooling tubes through which a coolant such as cooling water flows. Therein part of the heat is discharged by convection to the coolant. The coolant supply and return lines, e.g., pipes, are denoted by 23 and 24.

The condensed steam is collected with a condensate tank 25. The attached line, e.g., pipe, 26 is used to remove the condensate 27. It flows by geodetic head either through a line, e.g., a pipe, 26a into the water pool 28 or, for the purpose of cooling, through a line, e.g., a pipe, 26b back into reactor 1. The nonreturn valve 29 has the double purpose of preventing return flow of gaseous constituents to the cooling device 22 during an accident and of ensuring isolation of the primary system during undisturbed operation.

Meanwhile, the turbocompressor unit comprising a fan wheel 17, a shaft 18 and a compressor wheel 21 is intended to support removal of incondensible gases from the device 15 and to prevent development of stratification.

Figure 2:
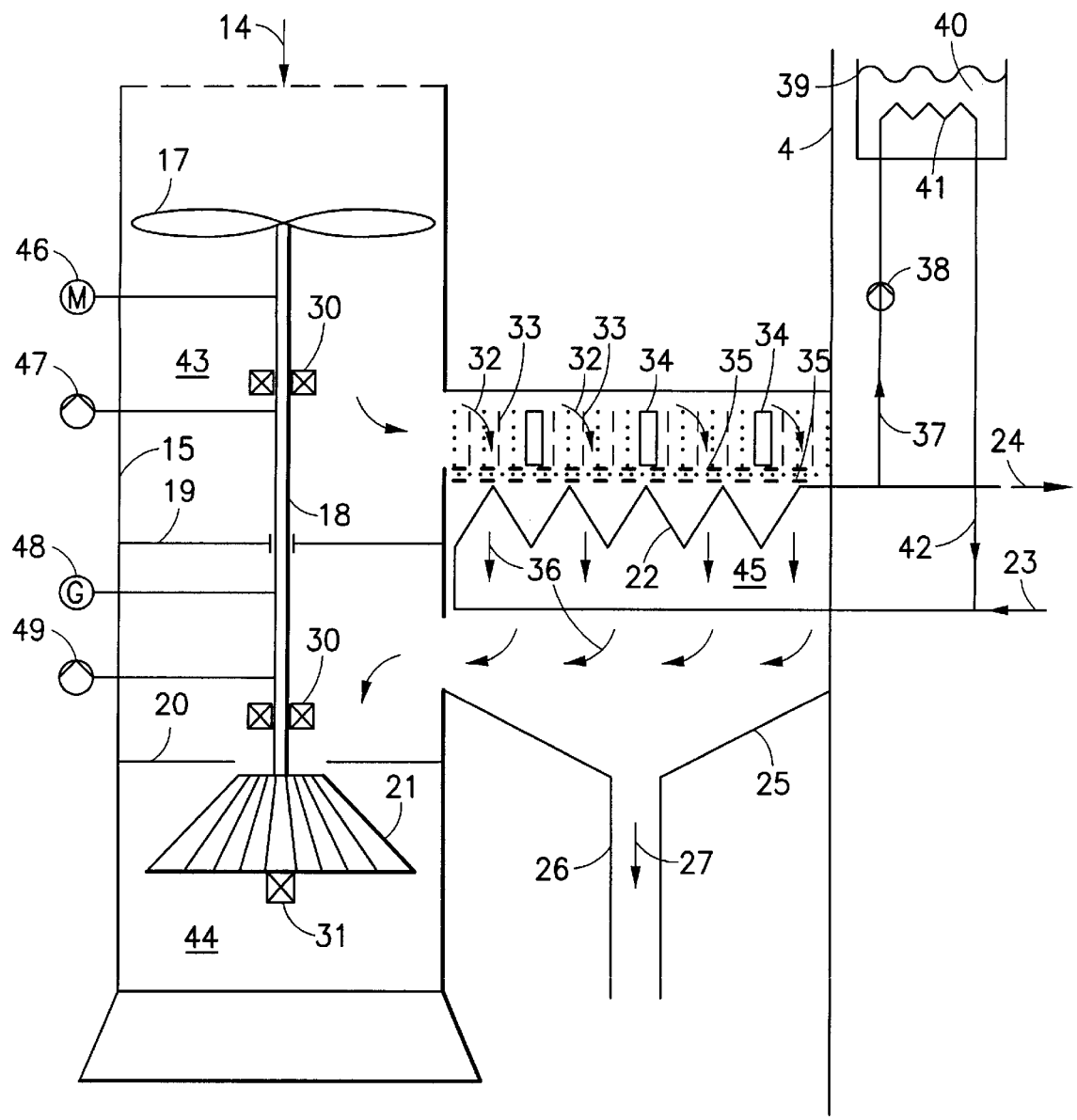
FIG. 2 shows a detailed schematic diagram of the device according to the present invention which is shown in FIG. 1.

Further details of the device 15 are evident in FIG. 2. By virtue of the condensation and cooling of part of the accident atmosphere, the volume of entering gas mixture is reduced and thus also the pressure is lowered at cooling device 22, which is disposed in a volume (space) 45. This results in a downwardly directed flow of the gas mixture, as illustrated by the arrows 36. Because of the pressure difference that now exists between inlet 14 and cooling device 22, the fan wheel 17 together with shaft 18 is caused to rotate. Therewith there is driven a compressor wheel 21, which compresses the incondensible constituents of the inlet mixture and ejects them at a higher velocity.

The two volumes (spaces) 43 and 44 enclosing the fan wheel 17 and the compressor wheel 21 are separated from each other by a partition 19, so that the gas mixture does not flow directly into the bottom volume 44, but instead only a gas mixture arriving from cooling device 22 can enter the volume 44 through inlet 20.

The rotating parts ride on radial bearings 30 having the lowest possible friction, such as permanent magnetic bearings, and on one axial bearing 31, in order to facilitate autonomous starting of the turbocompressor unit. To support functioning, an electric-motor 46 can also be provided for driving the turbocompressor unit. Furthermore, the compressor wheel 21 can be designed such that torque, which would adversely affect the starting behavior, is not generated by return flow.

If oxygen is present and at the same time elimination of hydrogen is desired, catalyst elements 33 and 35, through which the hydrogen-containing mixture 32 must flow before it is cooled, can be disposed close to cooling device 22. A reaction with the liberation of heat takes place on these elements even at hydrogen concentrations outside the ignition limits.

Cooling elements 34 are provided between the catalyst elements 33 disposed in series in order to prevent excessively high reaction temperatures. The cooling elements 34 can be devices through which liquid or gas flows or else relatively thick metal or ceramic plates with high specific heat capacity for the purpose of heat storage or heat dissipation can be employed. The heat generated at the catalyst elements 35 is discharged to the cooling device 22. The steam generated by the exothermic reaction is also condensed. The associated volume reduction leads to an additional pressure difference.

The net result is that a greater flow of mixture is sucked in and therefore stratification in the dome of the containment is largely prevented. The stripped and cooled mixture exits the bottom of housing 15 through outlet 16, supported by the downdraft of cooled gases. A sufficiently long construction of the downflow region can reinforce the downdraft, favor the starting behavior of the turbocompressor unit and diminish return flows during the starting phase.

The entrainment of condensate contributes, in the manner of a spray device, to further intensify cooling of the containment atmosphere, unless the condensate is predominantly used selectively for emergency cooling via a collection tank 25 and a drain line 26.

Since the device 15 can be installed in the upper zones of the containment, a relatively high injection pressure into line 26 is achieved. A further possibility comprises the use of a pump 47, which can also be driven by shaft 18 and fed with condensate from the collection tank 26. By means of the pump 47, the water can either be introduced into the containment atmosphere to cool it and to wash out aerosols, or can be used at appropriate pressure for emergency cooling purposes. In principle, other units such as a generator 48 and a compressor 49 can also be driven via shaft 18.

In addition to the already discussed cooling device 22 with coolant lines, e.g., pipes, 23 and 24, a further passive cooling possibility is illustrated in FIG. 2. The hot coolant 37 ascends either by virtue of natural upwelling or is transported by a pump 38 into coolant tank 39 with coolant pool 40. It releases its heat into cooler 41 and returns in cooled condition through line, e.g., pipe, 42 to the supply side. In this connection, the cooling tubes of cooling device 22 can be inclined to assist passive circulation of the coolant. As an option, the cooling device 22 can also be designed as a passively operating heatingtube system, with which the heat can be removed to the outside.

It will be appreciated that the instant specification is set forth by way of illustration and not limitation, and that various modifications and changes may be made without departing from the spirit and scope of the present invention.

What is claimed is:

1. A device for the cooling and mixing of a gas from an accidental gas leak comprising:
   a housing, which is provided with an inlet for receiving the gas and an outlet from which the gas exits the housing and which defines a flow path for the gas,
   a fan wheel, which is disposed in the housing downstream from the inlet and which is rotatable driven by the gas, the fan wheel being connected to a shaft which is rotated by the rotatable driven fan wheel,
   a cooling device disposed between the fan wheel and the outlet to provide a cooled gas, and
   a compressor wheel, which is connected to the shaft and which is disposed between the cooling device and the outlet, to provide a swirling motion to the cooled gas and to direct the cooled gas through the outlet,
   the fan wheel, the shaft and the compressor wheel in combination form a turbocompressor unit, wherein the housing encloses a tubular volume containing the shaft and a perpendicularly disposed volume containing the cooling device, and a partition is disposed around the shaft and perpendicularly with respect to the shaft to separate upper and lower portions of the tubular volume which are in communication with each other via the perpendicularly disposed volume.

2. The device according to claim 1, wherein the flow path inside the housing is directed substantially from top to bottom.

3. The device according to claim 1, wherein the cooling device is disposed substantially perpendicular to the housing.

4. The device according to claim 1, wherein a coolant flows in the cooling device and inlet and outlet coolant lines are in communication with the cooling device.

5. The device according to claim 1, which further comprises a condensate tank which is disposed downstream of the cooling device and is provided for collecting the resultant condensate.

6. The device according to claim 5, wherein a line is provided for removing the condensate from the condensate tank.

7. The device according to claim 1, which further comprises radial bearings and an axial bearing which are disposed adjacent to the shaft and are provided as a bearing system for the shaft.

8. The device according to claim 1, which further comprises a motor connected to the shaft.

9. The device according to claim 1, wherein the shaft is connected to a pump, a generator or a compressor.

10. The device according to claim 1, which further comprises at least one catalyst element which is disposed adjacent to the cooling device.

11. The device according to claim 10, wherein at least one cooling element is disposed adjacent to the at least one catalyst element and is provided for cooling the at least one catalyst element.

12. The device according to claim 11, wherein the at least one cooling element forms a cooling loop with the cooling device.

13. The device according to claim 12, wherein the at least one cooling element comprises a plurality of cooling elements provided between a plurality of the catalyst elements and are disposed in series.

14. The device according to claim 1, which further comprises radial bearings and an axial bearing which are disposed adjacent to the shaft.

15. The device according to claim 14, which further comprises a condensate tank which is disposed downstream of the cooling device.

16. The device according to claim 15, wherein the fan wheel is disposed at one end of the shaft and the compressor wheel is disposed at an opposite end of the shaft.

17. A reactor system comprising:
   a reactor vessel,
   a containment which sealingly encapsulates the reaction vessel and provides space between the reaction vessel and the containment for accommodating a gaseous atmosphere, and
   the device according to claim 1, said device being disposed in the containment, wherein accidental gas leaks from the reaction vessel enter the gaseous atmosphere in the containment and are received in the inlet of the device, and wherein the cooled gas from the outlet of the device is returned to the gaseous atmosphere in the containment.

18. The device according to claim 16, which further comprises a condensate tank which is disposed downstream of the cooling device and a conduit which is provided for removing condensate from the condensate tank.

19. The device according to claim 18, which further comprises at least one catalyst element which is disposed adjacent to the cooling device.

20. The device according to claim 19, wherein at least one cooling element forms a cooling loop with the cooling device.

* * * * *